UNITED STATES PATENT OFFICE.

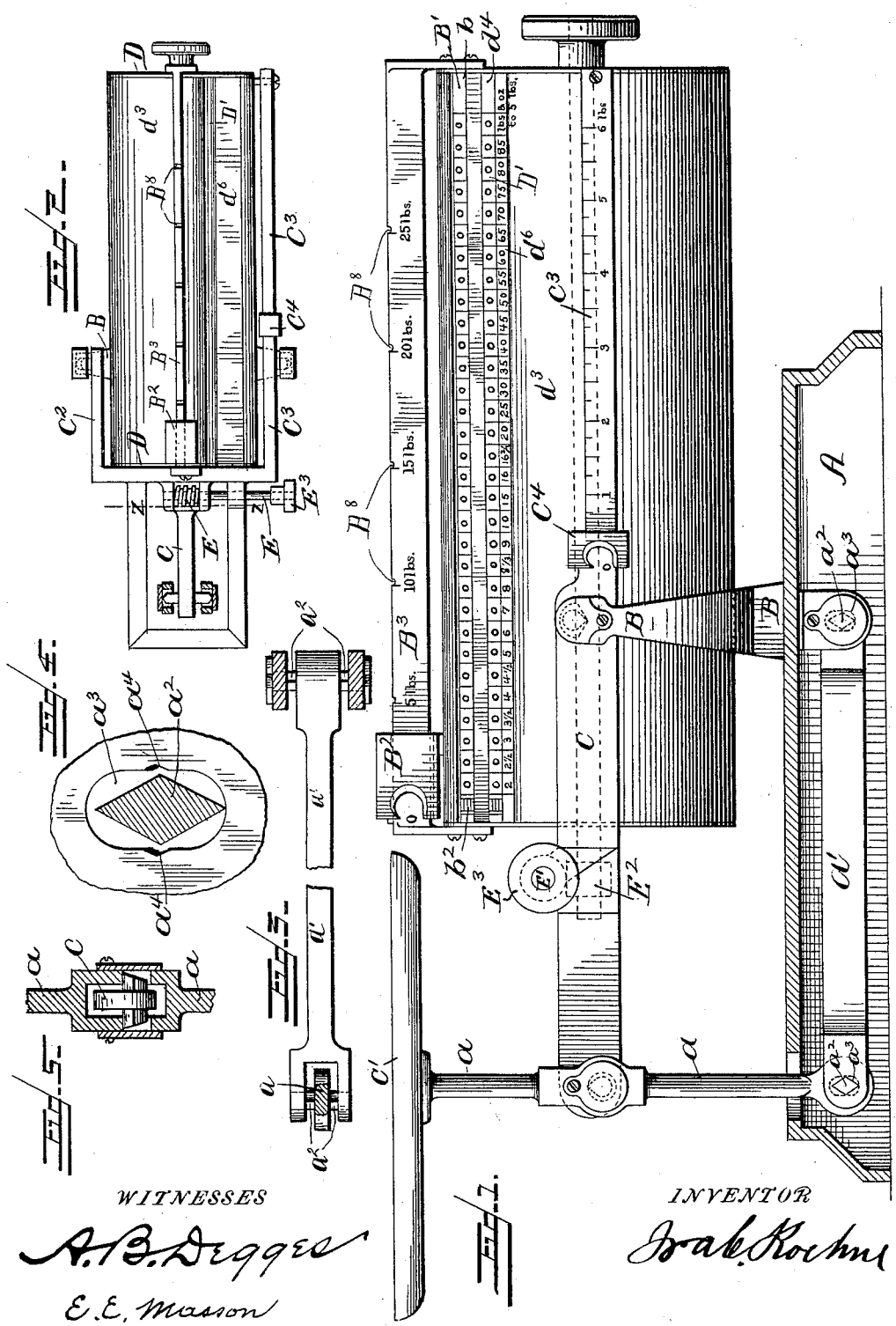

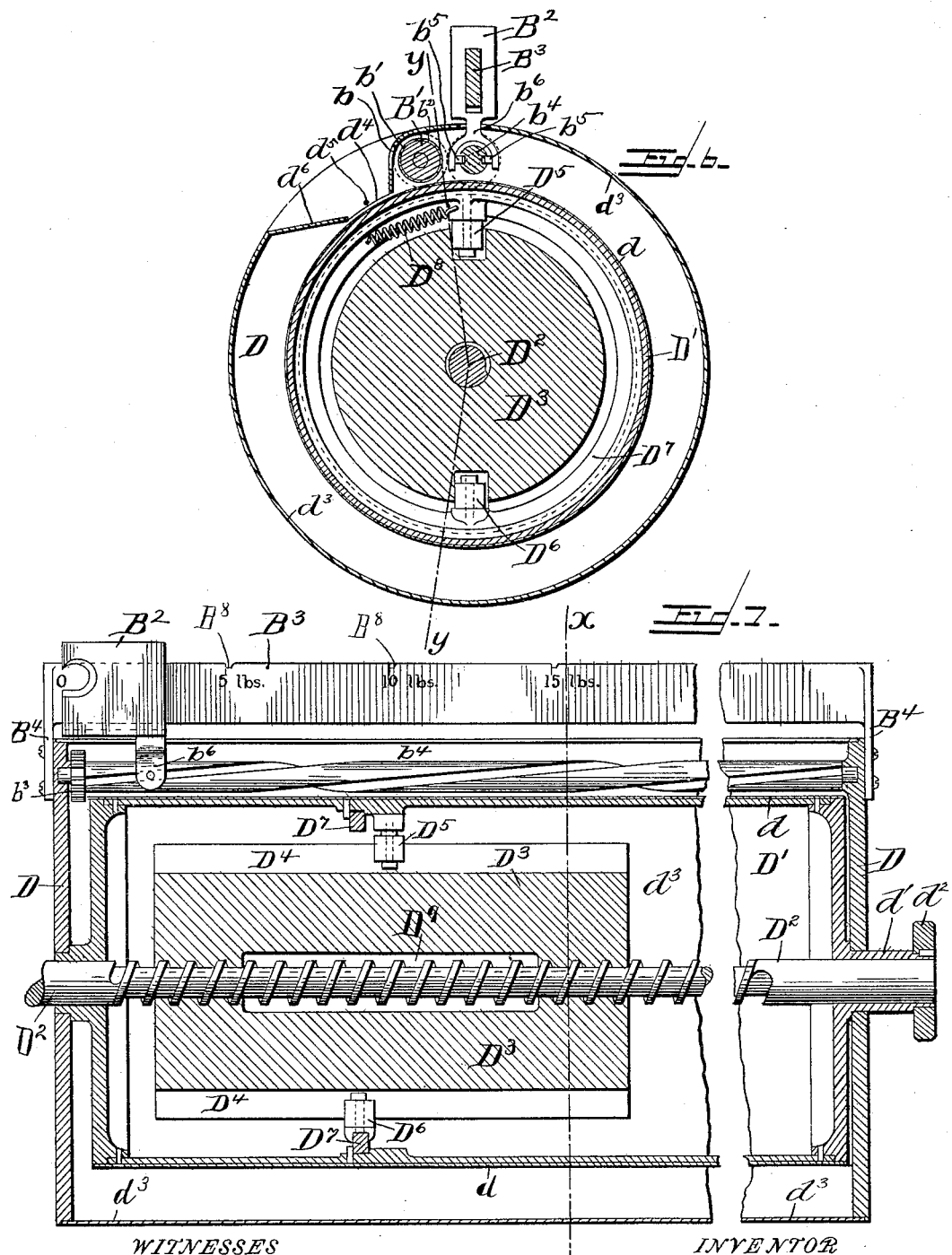

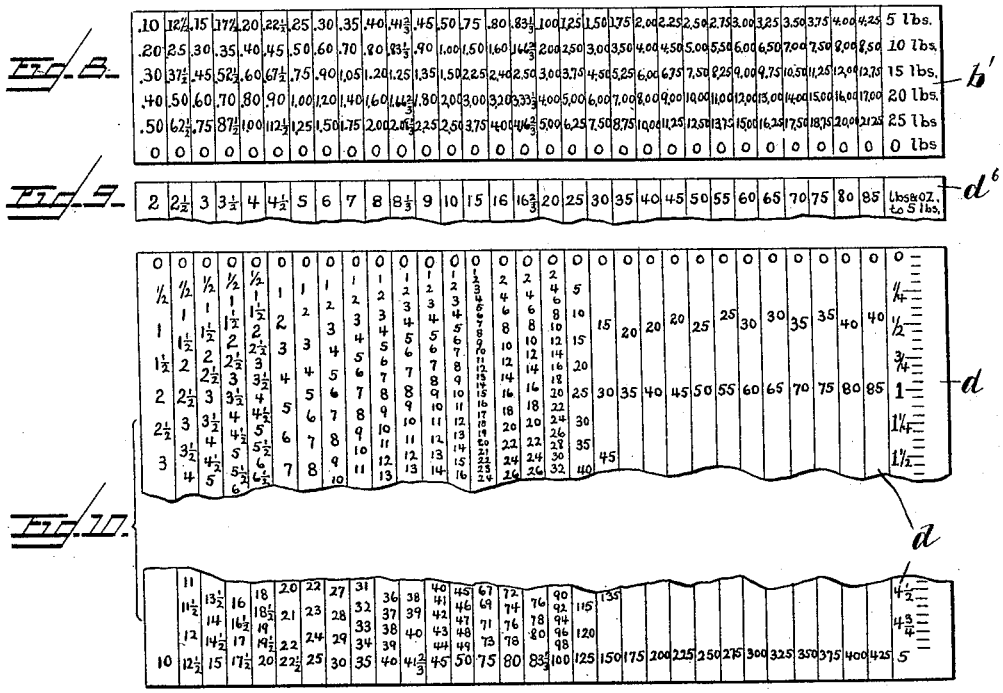

IRA C. KOEHNE, OF COLUMBUS, OHIO.

COMPUTING-SCALE.

SPECIFICATION forming part of Letters Patent No. 591,629, dated October 12, 1897.

Application filed August 2, 1895. Serial No. 558,179. (No model.)

*To all whom it may concern:*

Be it known that I, IRA C. KOEHNE, residing at Columbus, in the county of Franklin and State of Ohio, have invented certain new and useful Improvements in Computing-Scales; and I do hereby declare the following to be a full, clear, and exact description of the same, reference being had to the accompanying drawings, forming a part of this specification, and to the letters of reference marked thereon.

This invention relates to improvements in computing-scales by means of which an article is not only accurately weighed, but also the price or cost of said article is computed by the same operation; and it more particularly relates to that class of scales in which a counterbalance coöperates with a graduated cylinder to indicate both the weight and the cost of the article placed upon the platform, while a graduated price-scale registering with said cylinder indicates its unit price per pound, said cylinder being usually movable and having a series of sets of graduations thereon, each set of graduations being computed at a different rate per unit, and it is one of the prime objects of this invention to enlarge the capacity of such scales, whereby the value of an article may be read instantly when its weight is greater than can be counterbalanced by the said movable poise, thereby necessitating the use of a second movable poise coöperating with a second cylinder provided with a series of graduations or numbers computed in multiples of each of the highest values indicated upon said first cylinder.

The invention consists in certain novel details of construction and combinations and arrangements of parts, all as will be now described, and pointed out particularly in the appended claims.

Heretofore it has been common to impart a revoluble and a longitudinal movement to the graduated cylinder to counterbalance the article being weighed or sold; also it is common practice to drive the poise by a screw; but I am not aware that a revoluble and non-longitudinally-movable graduated cylinder has been employed to drive the poise. Furthermore, in increasing the capacity of scales of this character it has been common to employ a double set of cost-graduations corresponding to each price per unit, one set indicating the value of an article when balanced by the poise alone and the other set indicating the value of an article when balanced by the counterpoise plus the poise. Devices of this class only double the ordinary poise capacity of the scale. However, so far as I am aware, I am the first in the art to provide means for exposing said value or cost capacity increasing figures or graduations in proportion to the counterbalancing weight exerted by said second poise or counterweight, as in the instance shown the present invention increases by any desirable number of times the ordinary cost or value capacity of a scale.

It is obvious that features of this invention may be used with advantage on machines other than computing-scales of this precise type and that it is not absolutely necessary that all of these parts and combinations be employed even in a computing-scale. Therefore the invention is not to be restricted in its broader scope to the forms and arrangements and combinations of the parts, nor to the details of construction herein shown and described, but contemplates in its scope all forms of apparatus embodying this cost or value capacity increasing feature, however widely they may differ in construction.

Referring to the accompanying drawings, Figure 1 is a front elevation of a simple even-balance scale constructed in accordance with my present invention. Fig. 2 is a plan thereof upon a reduced scale. Figs. 3, 4, and 5 represent certain details of construction. Fig. 6 represents a section taken on line X X of Fig. 7. Fig. 7 is a longitudinal section of the graduated cylinder and its coöperating poise taken on line Y Y of Fig. 6. Fig. 8 is a view of a plane upon which is indicated the figures or graduations appearing in this instance upon the value-capacity-increasing cylinder. Fig. 9 is a view of a portion of the price-per-pound scale. Fig. 10 is a view of a plane upon which is indicated the figures or graduations appearing in this instance upon the value-cylinder. Fig. 11 is a section of part of the beam C, taken on line Z Z of Fig. 2; and Fig. 12 is a section taken on line & & of Fig. 11.

Like letters of reference are used throughout the drawings and description to indicate identical parts.

The form of scale illustrated in this instance to exhibit my invention is the well-known simple lever-scale and needs no description further than to say that A indicates the base; B, the standard, having the bearings at the upper ends for the knife-edge journals of the beam C, which latter carries at its left-hand end a platform C' on a rod $a$, and at the right-hand end said beam C is bifurcated to form arms $C^2$ $C^3$, between and to which is rigidly secured the left-hand end piece D, supporting the cost or value cylinder D', said arms $C^2$ $C^3$ also carrying the knife-edge journals of said beam C. The arm $C^3$ is in this instance the only one which extends to the right of the knife-edge journals of beam C, on which end it is provided with pound and ounce graduations and a suitable poise $C^4$, which poise will hereinafter be referred to as the "tare-poise" and said beam $C^3$ as the "tare-beam." The right-hand end of the tare-beam thus formed is rigidly secured to the right-hand end piece D to rigidly secure said end piece.

Mounted rigidly to the beam C and centrally between its forks $C^2$ $C^3$ is a shaft $D^2$, threaded to accommodate a threaded weight or poise $D^3$, formed with an internal cavity $D^9$ to lessen friction on the threaded shaft, said poise being provided on opposite sides with channels or ways $D^4$, receiving rolls or studs $D^5$ and $D^6$, said roll $D^5$ being mounted upon the framework of the cost or value cylinder D' to spline or feather said cylinder and poise together, while said roll $D^6$ is mounted upon an independent ring or slide $D^7$, fitted to slide freely in said framework and provided with a spring $D^8$, one end of which is secured to said ring or slide $D^7$ and the other end to said framework. The spring $D^8$ thus prevents without friction any loss motion in the spline or feather between the value-cylinder D' and its driven poise $D^3$, which consequently renders the indicated result accurate, and in devices of this class accuracy is of extreme importance.

The periphery of the value-cylinder is covered over with any suitable material $d$, upon which is printed or otherwise produced suitable cost-indicating characters, the ones employed in this instance being shown in Fig. 10.

The head-pieces of the value-cylinder D' are mounted to loosely turn upon the rigid shaft $D^2$ and the end pieces D. Through the right-hand end piece D projects a sleeve $d'$, rigid upon the head-piece of the cylinder D', said sleeve $d'$ having rigidly secured to its outer end a thumb nut or wheel $d^2$ for the purpose of setting the value-cylinder D' and its coöperating poise $D^3$. The end pieces D have their peripheries covered and connected by a guard or shield $d^3$, leaving, however, an aperture $d^4$, Figs. 1 and 6, through which to expose the characters upon the value-cylinder D', and for the purpose of greater accuracy in observing said characters a fine wire $d^5$, Fig. 6, is stretched horizontally across said aperture $d^4$. Upon a stationary plate $d^6$, forming the lower edge of said aperture $d^4$, is formed a series of price-per-pound characters equivalent to those at which the characters on said value-cylinder were computed.

For the purpose of readily balancing scales of this class when in process of manufacture and also for easily keeping them in balance when in use I provide a worm E, Figs. 1, 2, 11, and 12, rigid on shaft $E'$, mounted to turn in suitable bearings in beam C and engaging with a worm-wheel $E^2$, rigid upon the shaft $D^2$, said shaft $D^2$ being held rigid by said worm and worm-wheel. When the scale is out of balance, a hand-wheel $E^3$ on the forward end of shaft $E'$ is turned, which through worm E and worm-wheel $E^2$ revolves shaft $D^2$ sufficiently to adjust the position of the poise $D^3$, threaded thereon, and thus rebalance the scale. To take up the loss motion in the teeth of the worm and worm-wheel caused by natural looseness and by wear, I split the worm-wheel $E^2$, (see Fig. 12,) one part being rigid to and the other loose upon the shaft $D^2$, and in the adjacent faces of the split worm-wheel $E^2$ is formed a series of pockets $e$, receiving coil-springs $e'$ of sufficient stiffness to take up the loss motion in the teeth of said worm and worm-wheel. The rod $a$ is connected to the left end, Fig. 1, of beam C by a knife-edged journal in any well-known manner, while the lower end of said rod $a$ is pivoted to one end of a "parallel-motion" or retaining lever $a'$, which is pivoted to said base A directly under the knife-edged supporting-pivots for the beam C. This structure is common in scales of the class shown, but the novelty in this instance consists in the nature of the pivots of said lever $a'$, which pivots consist of diamond-shaped steel portions $a^2$, having each edge a knife-edge, said diamonds $a^2$ being held preferably rigid in the respective ends of said lever $a'$ and engaging in an aperture $a^3$, slightly wider and longer than the diamond-shaped portions $a^2$, said aperture $a^3$ being provided on its lateral faces with V-shaped seats or depressions $a^4$, registering with the angles of the diamond-shaped portions $a^2$ at their shortest diameter, so as to prevent under all operative conditions of the scale any more than one knife-edge of said diamonds $a^2$ from contacting with the walls of said aperture $a^3$ to cause friction. This forms a very sensitive bearing and at the same time keeps the rod $a$ of pan C' in vertical alinement and renders the scale equally sensitive whether the article to be weighed is placed upon the edges or the center of the pan C'.

As so far described my invention consists merely in the structural improvement of well-known forms of scales.

I will now describe that part of my invention which is believed to be radically new and entitled to a correspondingly wide range of equivalents and liberal interpretation. In this description reference is had to Figs. 1, 2, 6, 7, and 8. Within the casing $d^3$ and adjacent to an aperture $b$ therein is mounted a value-capacity-increasing cylinder B′, having suitable bearings in the end pieces D. The cylinder B′ is covered by a suitable material $b′$, Figs. 6 and 8, upon which is produced a series of sets of characters representing multiples of each of the total values indicated upon the cylinder D′. On the left-hand end of the cylinder B′ is rigidly mounted a gear-wheel $b^2$, Fig. 1, (and in Fig. 6 for clearness said gear and its mate are shown in dotted lines,) and meshing therewith is a gear-wheel $b^3$, rigidly mounted upon a parallel shaft $b^4$, mounted to turn in bearings in the end pieces D, said shaft $b^4$ having double spiral threads formed therein and adapted to receive studs or rolls $b^5$ therein. The rolls or studs $b^5$ are mounted on the bifurcated ends of an arm $b^6$, rigid with the value-capacity-increasing poise $B^2$, mounted upon a scale-beam $B^3$, supported at its respective ends by standards $B^4$, secured in this instance to the end pieces D. The said arm $b^6$ extends downward through a slot in casing $d^3$, as shown in Fig. 6. The top of the beam $B^3$ is preferably notched in this instance and the poise $B^2$ provided with an engaging projection, as is customary with poises moving upon notched beams. The beam $B^3$ is provided with a notch $B^8$ for each multiple indicated upon the cylinder B′. The pitch of the spiral threads formed in the shaft $b^4$ is such that when the poise $B^2$ rests in a notch in the beam $B^3$ the characters on cylinder B′ of a corresponding multiple are exposed in the aperture $b$. When desirable, the worm E and worm-wheel $E^2$, which constitute the balance-adjusting mechanism, may be employed instead of the tare-poise $C^4$, and when it is desirable to measure the tare of an article (pan, plate, bucket, &c.) it can be done first upon the cylinder D′, then the record destroyed by returning the cylinder D′ to zero or normal position, and finally rebalancing said tare by said worm and worm-wheel adjusting mechanism. It will be readily seen that by bifurcating the beam C and mounting the knife-edge pivots in the bifurcated ends the computing-cylinder D′ can extend between and on each side of the supporting-pivots of beam C, and consequently can be made much longer and thus give the scale a greater computing capacity with a comparatively short beam. Clearly it is immaterial whether the cylinder B′ be driven indirectly by the threaded shaft $b^4$ or directly driven by the poise $B^2$ by having the spiral threads formed on its own periphery, so as not to interfere with the reading of the characters thereon. It is obvious that instead of forming two ways $D^4$ in poise $D^3$ for rolls or studs $D^5$ and $D^6$ said rolls may be mounted in the same way $D^4$, with the spring $D^8$ drawing them in opposite directions to eliminate loss motion in the spline or feather thus formed.

In computing the values of or weighing articles of five pounds or less the cylinder D′ is revolved by means of its integral thumb-wheel $d^2$, which movement imparts a revoluble and a longitudinal movement to poise $D^3$ by reason of its splined connection with cylinder D′ and said poise being mounted upon the normally-rigid screw-shaft $D^2$. This longitudinal movement of poise $D^3$ counterbalances the weight whose value appears in aperture $d^4$, directly under wire $d^5$ and opposite the appropriate price per pound appearing upon the stationary price-per-pound scale $d^6$, while articles exceeding five pounds in weight are first partially counterbalanced by moving poise $B^2$ on beam $B^3$ and into its nearest notch $B^8$ under the weight of said article. This movement of poise $B^2$ rotates threaded shaft $d^4$ by means of the engaging rolls or studs $b^5$ in the bifurcated ends of arm $b^6$, rigid with poise $B^2$. The revoluble movement of shaft $b^4$ revolves a cylinder B′ by means of gear-wheels $b^2$ and $b^3$, said cylinder indicating through aperture $b$ a series of sets of characters, each set representing multiples of the different value capacities on cylinder D′, the characters on cylinder B′ being adapted to fully appear in aperture $b$ when the driving-poise $B^2$ drops into each notch $B^8$ in beam $B^3$, while values intermediate notches $B^8$ on beam $B^3$ are counterbalanced and indicated by the movement of cylinder D′, as previously described.

In the common construction of retaining-lever A′ articles to be weighed accurately must be placed centrally on platform C′, since if said article be placed on the right or left side of said platform, Fig. 1, it would tend to move the lower end of rod $a$ in the opposite direction and thus cause a bind in the pivotal connection between said rod $a$ and retaining-lever $a′$; but in the present construction a lateral movement of rod $a$ causes either of the horizontally opposite knife-edges of diamond-shaped pivots $a^2$ to seat themselves in either of the opposite V-seats $a^4$, which makes as sensitive a bearing as the ordinary knife-edge bearing. It will be readily seen that the upper knife-edge of diamond-shaped pivots $a^2$ never bear against the top of apertures $a^3$ only when the scale is inverted, which aperture $a^3$ is only closed on its top side in view of this emergency.

From the foregoing description it is obvious that articles weighing (in the instance shown) five pounds or less may be weighed and have their values computed by operating the cylinder D′ alone, while articles exceeding (in the instance shown) five pounds in weight can only be weighed and have their values computed by first moving the poise $B^2$ into the nearest notch under the weight of the article and then moving the cylinder D′ until a true balance is obtained. The proper value indicated upon the cylinder B' must be mentally added to the proper value indicated directly under wire $d^5$ and upon the cylinder D' to obtain the correct result, which result is either the value of the article or its weight or both at once. As these values are indicated in vertical alinement and near to each other this mental addition is readily accomplished.

Having now fully described my invention, what I claim as new, and desire to secure by Letters Patent, is—

1. The combination of a pivoted beam carrying a revoluble graduated cylinder, a poise, and means for imparting a revoluble and a longitudinal movement to said poise proportionate to the revoluble movement of said cylinder, substantially as specified.

2. The combination of a pivoted beam, a rotary non-longitudinally-movable cylinder carrying a peripherical scale indicating weight and a series of scales indicating values of predetermined quantities, said cylinder extending on both sides of the fulcrum of said beam; a stationary price-per-pound scale carried by said beam adjacent to said cylinder, a poise within said cylinder, and means for imparting a revoluble and a longitudinal movement to said poise proportionate to the revoluble movement of said cylinder, substantially as specified.

3. The combination of a pivoted beam, a rotary non-longitudinally-movable cylinder carrying a peripherical scale indicating weight and a series of peripherical scales indicating the values of predetermined quantities, a stationary price-per-pound scale carried adjacent to said cylinder, a revoluble longitudinally-movable poise within said cylinder, and means for revolving said poise proportionate to the revoluble movement imparted to said cylinder, substantially as specified.

4. The combination of a pivoted beam, a rotary cylinder carrying peripherical characters computed at different rates per unit, means for designating the proper character indicated, a revoluble counterbalance located within said cylinder, and means including said cylinder and a normally-rigid member for varying said counterbalance in proportion to the revoluble movement imparted to said cylinder, substantially as specified.

5. The combination of a pivoted beam, a rotary cylinder carrying peripherical indicating-characters, means for designating the proper character indicated, a poise mounted upon a normally-rigid screw and within said cylinder, and means for revolving said poise and cylinder in unison, substantially as specified.

6. The combination of a pivoted beam, a rotary cylinder carrying peripherical columns of characters computed at different rates per unit, means for designating the proper character indicated, a poise mounted upon a normally-rigid screw concentric with and independent of said cylinder, said poise being feathered to and free to slide within said cylinder, substantially as specified.

7. The combination of a pivoted beam, a rotary cylinder carrying peripherical indicating-characters, means for designating the proper character indicated, a poise mounted upon a screw concentric with said cylinder, ways on opposite sides of said poise, projections carried by said cylinder and fitting into said ways, one of said projections being rigid with said cylinder, and the other projection being spring-pressed, substantially as specified.

8. The combination of a pivoted beam, a rotary cylinder carrying peripherical indicating-characters, means for designating the proper character indicated, a revoluble poise $D^3$ mounted on a normally-rigid screw $D^2$, ways $D^4$ on opposite sides of said poise, projections $D^5$ and $D^6$ fitting into said ways, the projection $D^6$ being mounted upon a spring-pressed slide, substantially as specified.

9. The combination of a pivoted beam, a revoluble graduated cylinder, a poise moving longitudinally proportionate to the revoluble movement imparted to the said cylinder, and means for operating said poise independent of and without changing the value indicated on said cylinder, substantially as specified.

10. The combination of a pivoted beam, a revoluble cylinder carrying peripherical indicating-characters, means for designating the proper character indicated, a poise located within and moving longitudinally proportionate to the revoluble movement of said cylinder, and means for operating said poise independent of said cylinder to counterbalance tare-weights, substantially as specified.

11. The combination of a pivoted beam, a revoluble graduated cylinder, a poise mounted upon a normally-rigid screw, said poise being feathered to and free to slide within said cylinder, and means for moving said screw to shift said poise without disturbing the indication upon said cylinder to counterbalance tare-weights, substantially as specified.

12. The combination of a pivoted beam, a revoluble graduated cylinder, a poise mounted upon a normally-rigid screw, said poise being feathered to and free to slide within said cylinder, and a worm and worm-wheel mechanism for moving said screw to shift said poise without disturbing the indication upon said cylinder for counterbalancing tare-weights, substantially as specified.

13. The combination of a base, the scale-beam fulcrumed thereon, a platform pivoted to one end of said beam, a retaining-lever $a'$ for said platform, bearings connecting said lever $a'$ with a projection of said platform and of said base, said bearings consisting of diamond-shaped pivot portions $a^2$ having a series of three or more knife-edges projecting in different directions and engaging in an aperture $a^3$ provided on opposite sides with bearing-seats $a^4$, substantially as specified.

14. The combination of a base, the scale-beam fulcrumed thereon, a platform pivoted to one end of said beam, a retaining-lever $a'$ for said platform, a pivot portion $a^2$ having a series of knife-edges projecting in different directions and rigidly mounted in each end of said lever $a'$, and bearing-seats for said pivots $a^2$ formed respectively in the projection of said platform and of said base, said bearing-seats consisting of an aperture $a^3$ provided on opposite sides with V-shaped seats $a^4$, substantially as specified.

15. In a scale-bearing, the combination of a diamond-shaped pivot $a^2$ having a series of three or more knife-edges projecting in different directions, and a bearing therefor consisting of an aperture $a^3$ provided on opposite sides with V-shaped seats $a^4$; whereby vertical strains bring the upper or lower knife-edges of pivot $a^2$ in contact only with the upper or lower edge of aperture $a^3$, while lateral strains are received only by the lateral knife-edges of pivot $a^2$ contacting only with one of the V-shaped seats $a^4$, and the position of seats $a^4$ is such as to free the vertical knife-edges of pivot $a^2$ from contact with aperture $a^3$ when one of the lateral knife-edges of pivot $a^2$ is in contact with one of said seats $a^4$, substantially as specified.

16. In a scale, the combination of a revoluble cylinder carrying peripherical columns of characters, a normally-rigid screw supporting a variable counterbalance adapted to be revolved and moved longitudinally in proportion to the revoluble movement of said cylinder, non-revoluble end pieces between which said cylinder revolves, and a wire stretched between said end pieces and adapted to accurately designate the proper characters indicated, substantially as specified.

17. In a scale, the combination of a revoluble graduated cylinder, a counterbalance mounted upon a normally-rigid screw, said counterbalance being feathered to and free to slide within said cylinder, for being revolved and moved longitudinally in proportion to the revoluble movement of said cylinder, non-revoluble end pieces between which said cylinder revolves, a covering for said cylinder secured to said end pieces, an exposing-opening in said covering, and a wire extending across said opening to accurately designate the proper characters indicated, substantially as specified.

18. In a computing-scale, the combination of a series of sets of characters indicating values computed at different rates per unit, a second series of characters indicating the units at which said values were computed, a counterbalance member adapted to indicate said first characters, a third series of sets of characters indicating values computed in different multiples of only the highest value indicated by each different set of said first characters, and a second counterbalance member exerting influence in multiples of said first member and adapted to indicate the values representing like multiples in said third series of characters, substantially as specified.

19. In a computing-scale, the combination of a pivoted beam supporting the following instrumentalities, viz., a member provided with a series of sets of characters indicating values computed at different rates per unit, a second member provided with a series of characters indicating the units at which said values were computed, a variable counterbalance, means intermediate said first member and variable counterbalance for automatically indicating all the different sets of values proportionate to the effect exerted by said counterbalance, a third member provided with a series of sets of characters indicating values computed in different multiples of only the highest value indicated by each different set of said first characters, a second variable counterbalance exerting influence only in multiples of said first counterbalance, and means intermediate said third member and said second counterbalance for automatically indicating all the different values representing like multiples proportionate to the influence exerted by said second counterbalance, substantially as specified.

20. The combination of a series of sets of characters computed at different rates per unit, a counterbalance, means including said counterbalance for indicating said characters proportionate to the effect exerted by said counterbalance, a second series of sets of characters adjacent to said first characters, each set of said second characters consisting of values computed at different multiples of only the highest value indicated in each corresponding set of characters in said first series, a second counterbalance, and means including said second counterbalance, for varying the indicated multiple of said second characters over said first characters and changing the counterbalancing effect proportionately, substantially as specified.

21. In a computing-scale, the combination of a pivoted beam supporting the following instrumentalities, viz., a revoluble cylinder carrying a series of peripherical columns of characters indicating values at different rates per unit, said values being adapted to represent equal weights in the same longitudinal row, a scale adjacent to said cylinder for indicating the units at which said characters were computed, a variable counterbalance, means intermediate said cylinder and counterbalance for causing said counterbalance to exert influence proportionate to the values indicated by said cylinder, a second cylinder carrying a series of peripherical columns of characters, each column consisting of a series of characters each computed at a different multiple of only the highest value indicated in each corresponding column of characters on said first cylinder, the characters representing like multiples being arranged in longitudinal rows, a second counterbalance exerting influence only in multiples of said first counterbalance, and means intermediate said second cylinder and said second counterbalance for causing said cylinder to indicate multiples proportionate to the effect of said second counterbalance, a casing for said cylinders and a longitudinal exposing-opening in said casing for each cylinder, substantially as specified.

22. The combination with the revoluble cylinder carrying peripherical rows of characters indicating value and weight, said value-characters being computed at different prices per pound, a price-per-pound scale registering therewith, and a revolubly-variable counterbalance adapted to automatically exert a counterbalancing weight proportionate to the values indicated upon said cylinder, of a second cylinder revolving independent of and carrying characters indicating values in multiples of the capacity of said first cylinder, and a second variable counterbalance adapted to automatically exert a counterbalancing weight proportionate to the values indicated upon said second cylinder, substantially as specified.

23. The combination of the revoluble cylinder carrying peripherical rows of characters indicating different values and weight, a price-per-pound scale registering therewith, a variable counterbalance, means including said cylinder and a normally-rigid member for causing said counterbalance to automatically exert a counterbalancing weight proportionate to the values indicated upon said cylinder, a second cylinder carrying a series of sets of characters each set indicating in multiples of only the highest value indicated in each row of characters indicated by said first cylinder, a second counterbalance, and means for causing said second cylinder to indicate its value proportionate to the counterbalancing weight exerted by said second counterbalance.

24. In a computing-scale, the combination of a computing-cylinder carrying a series of sets of characters computed at different rates per unit, a variable counterbalance therefor, a second cylinder adjacent to said first cylinder and carrying a series of sets of characters, each set consisting of characters each computed at different multiples of only the highest value indicated in each corresponding set of characters on said first cylinder, a beam adjacent to said second cylinder, a poise sliding on said beam, means connecting said poise and second cylinder for causing said second cylinder to indicate multiples proportionate to the counterbalancing effect of said poise, notches in said beam at intervals designating said multiples, and a projection in said poise for engaging said notches, substantially as specified.

25. In a capacity-increasing mechanism for computing-scales, the combination of a series of movable characters indicating a series of different values in multiples of the ordinary capacity of a scale, a counterbalance member exerting influence in multiples of the ordinary capacity of a scale, intermediate means for automatically indicating the series of characters whose values are proportionate to the counterbalancing weight exerted by said counterbalance, a casing for said movable characters, an exposing-aperture in said casing for indicating said characters, and a slot in said casing to accommodate said intermediate means, substantially as specified.

26. In a capacity-increasing mechanism for computing-scales, the combination of a series of characters indicating a series of different values in multiples of the ordinary capacity of a scale, a counterbalance member exerting influence in multiples of the ordinary capacity of a scale, and intermediate means for automatically indicating characters whose values are proportionate to the counterbalancing weight exerted by said counterbalance.

27. In a computing-scale, the combination of a rotary non-longitudinally-movable cylinder provided with a series of peripherical columns of characters computed at different rates per unit, a counterbalance member exerting influence proportionate to the revoluble movement of said cylinder, a shaft upon which said cylinder revolves, a casing for said cylinder and counterbalance member, an aperture in said casing for exposing the characters on said cylinder, an operating member projecting without said casing, and means intermediate said operating member and said cylinder and counterbalance member for adjusting said cylinder and counterbalance member to counterbalance and properly indicate the values and weights, substantially as specified.

28. In a scale, the combination of a revoluble computing-cylinder, a shaft concentric with said cylinder, a casing for said cylinder, an exposing-opening in said casing for said cylinder, a poise on said shaft, and means for moving said poise without changing the indication of said cylinder.

29. The combination of a revoluble cylinder having a series of peripherical rows of value-indicating characters each computed at a different rate per unit, a stationary plate adjacent to said cylinder and having a series of characters indicating the different units at which said values were computed, each unit-indicating character being opposite its corresponding row of peripherical value-indicating characters, and a member adjacent to said cylinder and provided with one or more series of value-increasing characters indicating values in increments of only the highest value indicated by each row of said peripherical characters on said cylinder, said value-increasing characters being opposite their corresponding rows of characters on said cylinder, substantially as specified.

30. In a computing-scale, the combination of a weight-receiving member; a weight-counterbalancing member; an indicator movable proportionate to said counterbalancing member and having a series of rows of value-indicating characters each computed at a different rate per unit; a casing for said indicator; an exposing-opening in said casing; a series of characters adjacent to said exposing-opening and indicating, adjacent to each row of value-characters on said indicator, the unit at which each row of value-characters were computed; and one or more series of value-increasing characters indicating values in increments of a given value adapted to be indicated by each different row of value-characters on said indicator, said value-increasing characters being adjacent to their corresponding rows of value-characters on said indicator, substantially as specified.

IRA C. KOEHNE.

Witnesses:
C. W. JAMES,
H. D. WOOD.